(12) United States Patent
Chen et al.

(10) Patent No.: US 12,479,367 B2
(45) Date of Patent: Nov. 25, 2025

(54) ALL-TERRAIN VEHICLE

(71) Applicant: SEGWAY TECHNOLOGY CO., LTD., Changzhou (CN)

(72) Inventors: Mingtang Chen, Changzhou (CN); Mingyong Wang, Changzhou (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 742 days.

(21) Appl. No.: 17/864,487

(22) Filed: Jul. 14, 2022

(65) Prior Publication Data

US 2023/0019305 A1 Jan. 19, 2023

(30) Foreign Application Priority Data

Jul. 15, 2021 (CN) .......................... 202110809543.8
Jul. 15, 2021 (CN) .......................... 202121620153.8

(51) Int. Cl.
*B60R 5/04* (2006.01)
*B60K 13/02* (2006.01)
*B62D 21/02* (2006.01)
*B62D 21/06* (2006.01)
*F02M 35/02* (2006.01)

(52) U.S. Cl.
CPC .............. *B60R 5/04* (2013.01); *B60K 13/02* (2013.01); *B62D 21/02* (2013.01); *B62D 21/06* (2013.01); *F02M 35/0204* (2013.01)

(58) Field of Classification Search
CPC .......... B60R 5/04; B60K 13/02; B62D 21/02; B62D 21/06; F02M 35/0204
See application file for complete search history.

(56) References Cited

U.S. PATENT DOCUMENTS

| | | | |
|---|---|---|---|
| 5,327,989 A | 7/1994 | Furuhashi et al. | |
| 11,945,540 B2 * | 4/2024 | Lovold | B60K 15/063 |
| 11,951,839 B2 * | 4/2024 | Wang | B60K 6/40 |
| 2021/0122209 A1 * | 4/2021 | Miller | B60G 99/002 |
| 2022/0097511 A1 * | 3/2022 | Wang | B60K 1/04 |
| 2023/0019305 A1 * | 1/2023 | Chen | B62D 21/06 |

FOREIGN PATENT DOCUMENTS

| | | | |
|---|---|---|---|
| CN | 210309896 U | 4/2020 | |
| CN | 210310699 U | 4/2020 | |
| CN | 213231434 U | 5/2021 | |
| CN | 113335439 A * | 9/2021 | B60K 13/02 |
| CN | 215622521 U * | 1/2022 | B60K 13/02 |

(Continued)

OTHER PUBLICATIONS

Chinese Office Action dated Mar. 25, 2022 for Application No. 202110809543.8, 16 pages.

*Primary Examiner* — Jacob B Meyer
(74) *Attorney, Agent, or Firm* — Frost Brown Todd LLP

(57) ABSTRACT

An all-terrain vehicle includes a frame; two seats arranged on the frame; a container arranged on the frame and located at a rear side of the seat, a top of the container being open; a power system arranged on the frame; an air filter coupled to the power system, arranged on the frame and located below the container; and a storage box arranged on the frame and located behind the two seats, the storage box being detachably coupled to the frame, the air filter and/or the power system being repairable after the storage box being removed.

20 Claims, 2 Drawing Sheets

(56) References Cited

FOREIGN PATENT DOCUMENTS

| | | | |
|---|---|---|---|
| CN | 113062819 B * | 6/2022 | ............. B60K 13/04 |
| EP | 2444305 A2 | 4/2012 | |
| JP | 2850241 B2 * | 1/1999 | |
| WO | WO 2020/248569 | 12/2020 | |
| WO | WO-2022165974 A1 * | 8/2022 | ................ B60J 1/14 |

* cited by examiner

ALL-TERRAIN VEHICLE

CROSS-REFERENCE TO RELATED APPLICATIONS

This application claims priority to and benefits of Chinese Patent Application Serial No. 202110809543.8, filed with China National Intellectual Property Administration on Jul. 15, 2021, and Chinese Patent Application Serial No. 202121620153.8, filed with China National Intellectual Property Administration on Jul. 15, 2021, the entire content of which are incorporated herein by reference.

TECHNICAL FIELD

The present disclosure relates to the field of vehicle technologies, and more particularly, to an all-terrain vehicle.

BACKGROUND

At present, because of its simplicity, practicality and multiple uses, all-terrain vehicles have been used by more and more people in life, because they are simple and practical, have multiple uses, and can be driven on any terrain without the restriction of road conditions.

SUMMARY

An all-terrain vehicle according to embodiments of the present disclosure includes: a frame; a cockpit supported by the frame; two seats located in the cockpit and arranged on the frame; a container arranged on the frame and located at a rear side of the two seats, a top of the container being open; a power system arranged on the frame and located below the container; an air filter coupled to the power system and configured to deliver air to the power system, the air filter being arranged on the frame and located below the container; and a storage box arranged on the frame and located behind the two seats, the storage box being detachably coupled to the frame, the air filter and/or the power system being repairable after the storage box being removed.

BRIEF DESCRIPTION OF THE DRAWINGS

The above and/or additional aspects and advantages of the present disclosure will become apparent and easy to understand from following descriptions of embodiments in combination with accompanying drawings, in which.

Figure 1:
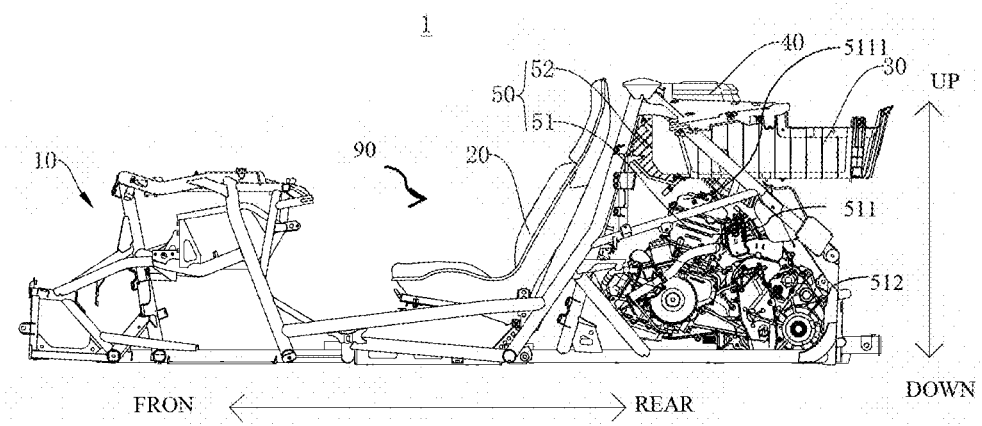
FIG. 1 is a schematic view of an all-terrain vehicle according to an embodiment of the present disclosure from a first perspective.

REFERENCE NUMERALS all-terrain vehicle 1;
frame 10; bottom bracket 11; the first support beam 12; cross beam 13; the second support beam 14; upper bracket 15; first mounting support 16; second mounting support 17; seat 20; container 30; repair opening 31; container bottom plate 32; container front plate 33; container side plate 34;
container rear plate 35; first step 36; second step 37;
storage box 40; boss 41; storage opening 42; storage box top plate 43; storage box front plate 44;
storage box rear plate 45; grip 46; cover plate 47; flanging 48; storage box bottom plate 49;
powertrain 50; power system 51; engine 511; cylinder head 5111; CVT 512; air filter 52; cockpit 90.

DETAILED DESCRIPTION

Embodiments of the present disclosure will be described in detail below, and the embodiments described with reference to the accompanying drawings are exemplary. The embodiments of the present disclosure will be described in detail below.

In the related art, a storage box of the all-terrain vehicles is mostly arranged at a cockpit. However, an occupied space by the storage box is easily limited by a space in the cockpit, so the storage box is unable to store more goods to meet the storage requirements of users.

An all-terrain vehicle 1 according to embodiments of the present disclosure is described below with reference to FIGS. 1 to 6.

Figure 2:
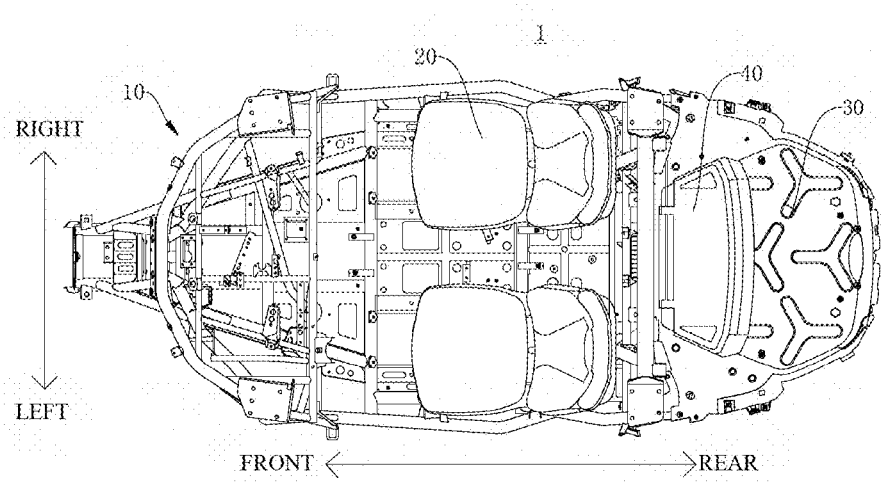
FIG. 2 is a schematic view of an all-terrain vehicle according to an embodiment of the present disclosure from a second perspective.

As illustrated in FIGS. 1 and 2, the all-terrain vehicle 1 according to embodiments of the present disclosure includes: a frame 10, a cockpit 90, two seats 20, a container 30, a power system 51, an air filter 52 and a storage box 40. The frame 10 may be constructed as an overall frame of the all-terrain vehicle 1, and may further be configured to mount and fix other components of the all-terrain vehicle 1. The cockpit 90 may be supported by the frame 10, and the seats 20 may be located in the cockpit 90. The seats 20 may make it easier for a user to drive the all-terrain vehicle 1, and the user may drive the all-terrain vehicle 1 by sitting on the seat 20, making it more relaxed and convenient. The container 30 may be configured to place goods, so that it is convenient for the user to carry the goods. The power system 51 and the air filter 52 are combined to form a powertrain 50. The power system 51 may provide power for the all-terrain vehicle 1. The storage box 40 may also be configured to storage the goods, so that the storage volume can be increased, thus improving the storage capacity of the all-terrain vehicle 1.

As illustrated in FIGS. 1 and 2, the frame 10 includes a longitudinal beam extending along a front-rear direction, and a vertical beam extending upwards from the longitudinal beam. The longitudinal beam and the vertical beam both have a mounting and fixing effect, and the longitudinal beam may further support components on top of it. The seats 20 are arranged on the frame 10, so that the seats 20 may be fixed on the all-terrain vehicle 1. The user may sit on the seats 20, and the frame 10 may support the seats 20, so that the seats 20 may have a certain bearing capacity. The container 30 is arranged on the frame 10, so that the container 30 may be fixed on the all-terrain vehicle 1. The container 30 may be configured to place the goods, and the frame 10 may support the container 30, so that the container 30 may have a certain bearing capacity. In addition, the container 30 is located at a rear side of the seats 20, i.e., the container 30 is located at an overall rear side of the all-terrain vehicle 1. Therefore the container 30 can be prevented from occupying the space of a cockpit and an energy compartment of the all-terrain vehicle 1, so that the structural layout of the all-terrain vehicle 1 is more reasonable. A top of the container 30 is open, so that it is convenient to place the goods to the container 30.

As illustrated in FIGS. 1 and 2, the power system 51 and the air filter 52 are arranged on the frame 10, so that the power system 51 and the air filter 52 may be fixed on the all-terrain vehicle 1, thus avoiding the damage to the power system 51 and the air filter 52 due to shaking. The power system 51 and the air filter 52 are both located below the container 30, and the air filter 52 is coupled to the power system 51 and configured to deliver air to the power system 51. It should be noted that during the operation the power system 51 needs to suck a large amount of air, so that the dust in the air is sucked into the power system 51, resulting in the abnormality of the power system 51. The air filter 52 is coupled to the power system 51, both the power system 51 and the air filter 52 are located below the container 30, and the air filter 52 is located above the power system 51, so that the air filter 52 may remove the dust in the air in advance, so that the dust can be prevented from entering the power system 51 and causing the abnormality of the power system 51.

As illustrated in FIGS. 1 and 2, the storage box 40 is arranged on the frame 10, similarly, so that the storage box 40 may be fixed on the all-terrain vehicle 1. The storage box 40 may also be configured to store the goods, and the frame 10 may support the storage box 40, so that the storage box 40 may have a certain bearing capacity. The storage box 40 is located behind the seats 20, the storage box 40 is at least partly located in the container 30, and the storage box 40 is detachably coupled to the frame 10. After the storage box 40 is removed, the air filter 52 and/or the power system 51 may be repaired. In other words, the storage box 40 may be removed from the frame 10. When the power system 51 and/or the air filter 52 fails, the storage box 40 may be removed from the frame 10 first, and then the power system 51 and/or the air filter 52 may be repaired from a removal position of the storage box 40. This is more convenient and avoids too many disassembly processes and steps.

In addition, as illustrated in FIGS. 1 and 2, the storage box 40 is arranged behind the seats 20, so that the storage box 40 can be prevented from being affected by the space of the cockpit and the energy compartment of the all-terrain vehicle 1. Furthermore this arrangement can make the structure of the all-terrain vehicle 1 more compact and utilize the space of the all-terrain vehicle 1 for storage as much as possible, thus better meeting the storage requirements of the user.

As illustrated in FIG. 1, the power system 51 and the air filter 52 are located below the storage box 40. The power system 51 and the air filter 52 are arranged below the storage box 40, so that the storage box 40 may be removed from the frame 10, and then the power system 51 and/or the air filter 52 below may be repaired directly from the removal position of the storage box 40 when the power system 51 and/or the air filter 52 fail, thus facilitating the repair of the power system 51 and/or the air filter 52. Moreover, this arrangement allows utilization of the space of the all-terrain vehicle 1 for storage as much as possible while facilitating the user to store and remove the goods from the storage box 40.

Further, along a left-right direction of the all-terrain vehicle 1, the power system 51 is located at a first side of the all-terrain vehicle 1, and the air filter 52 is located at a second side of the all-terrain vehicle 1. That is to say, the power system 51 and the air filter 52 are respectively arranged on a left side and a right side of the all-terrain vehicle 1, so that an operating space is defined between the power system 51 and the air filter 52, thus facilitating the relevant personnel to repair the power system 51 and/or the air filter 52 from the removal position of the storage box 40.

Figure 4:
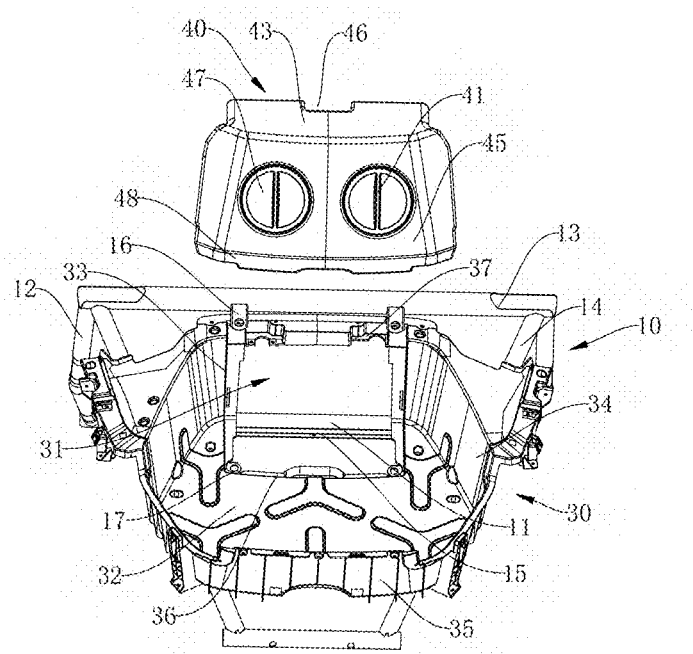
FIG. 4 is a partial exploded view of FIG. 3.
Figure 5:
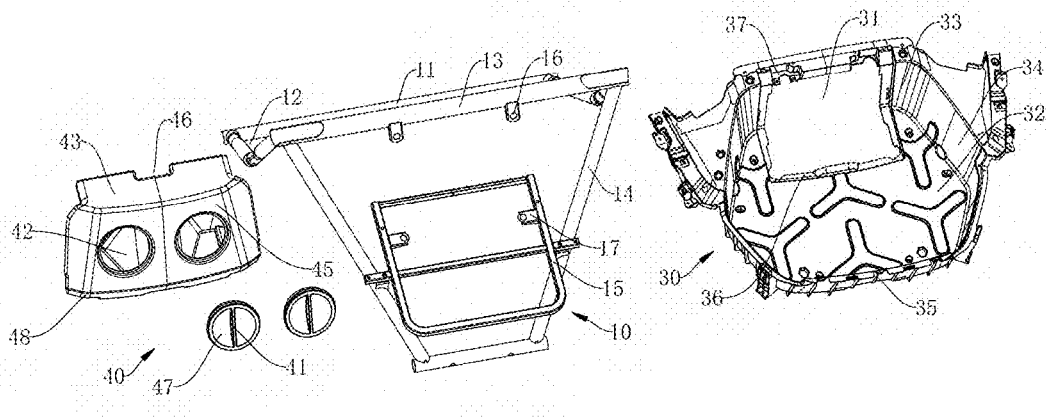
FIG. 5 is an exploded view of FIG. 3.

According to an optional embodiment of the present disclosure, as illustrated in FIGS. 1, 4 and 5, a repair opening 31 is defined in a position of the container 30 corresponding to the power system 51 or the air filter 52, and the storage box 40 is arranged at the repair opening 31. The repair opening 31 is defined in the container 30, and the storage box 40 may be coupled to the frame 10 through the repair opening 31, and thus arranged at the repair opening 31. Moreover, the repair opening 31 is arranged in correspondence to the power system 51 or the air filter 52, so that the power system 51 or the air filter 52 may be repaired more conveniently through the repair opening 31 when the storage box 40 is removed from the frame 10.

Figure 3:
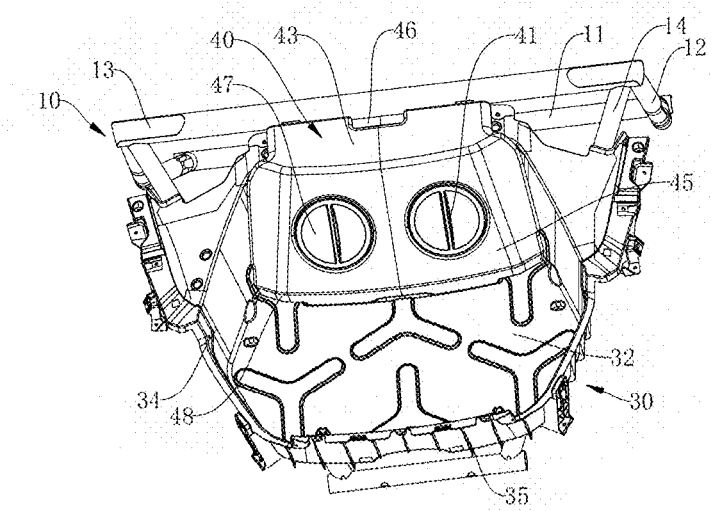
FIG. 3 is a partial view of an all-terrain vehicle according to an embodiment of the present disclosure.

Optionally, as illustrated in FIGS. 3 to 5, the container 30 includes: a container bottom plate 32, a container front plate 33, a container side plate 34 and a container rear plate 35, the container side plate 34 is coupled between the container front plate 33 and the container rear plate 35, and the repair opening 31 is defined in the container bottom plate 32 and/or the container front plate 33. The container side plate 34 is coupled between the container front plate 33 and the container rear plate 35, thus forming the overall structure of the container 30 and preventing the goods from falling from the container 30. The repair opening 31 is defined in the container bottom plate 32 and/or the container front plate 33. The repair opening 31 is defined in the container bottom plate 32, so that the operation during the repair of the powertrain 50 is more convenient. The repair opening 31 is defined in the container front plate 33, and the container front plate 33 is closer to a position of the powertrain 50, so that the operation is more convenient.

Figure 6:
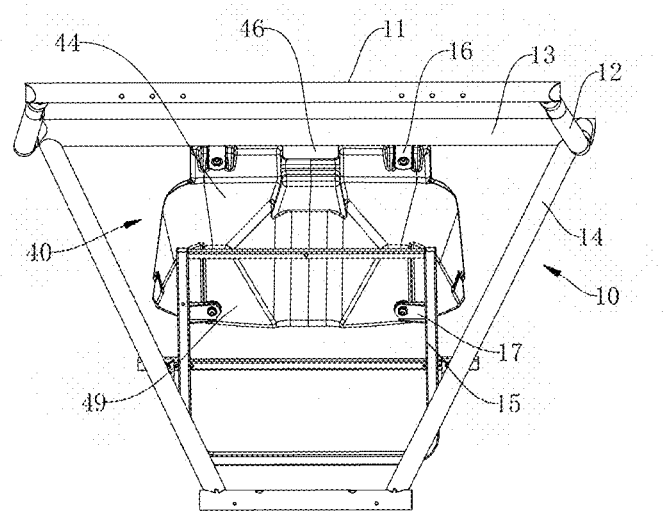
FIG. 6 is a schematic view of the mounting of a storage box and a frame.

Of course, as illustrated in FIG. 6, a communicated repair opening 31 is defined in the container front plate 33 and the container bottom plate 32, the storage box 40 includes a storage box bottom plate 49 and a storage box front plate 44 coupled to the container 30, and the storage box bottom plate 49 covers a part of the repair opening 31 in the container bottom plate 32. In other words, the container front plate 33 and the container bottom plate 32 may cooperatively define the communicated repair opening 31. In this case, the storage box bottom plate 49 needs to cover the part of the repair opening 31 in the container bottom plate 32, to improve the sealing of the container 30 and prevent the goods from leaking out from a gap between the storage box bottom plate 49 and the container bottom plate 32 and finally falling from the repair opening 31.

As illustrated in FIGS. 4 to 6, the storage box front plate 44 further covers a part of the repair opening 31 in the container front plate 33. Further, in order to prevent the goods from leaking out from a gap between the storage box front plate 44 and the container front plate 33, the storage box front plate 44 needs to cover the part of the repair opening 31 in the container front plate 33. In addition, when the storage box front plate 44 covers the part of the repair opening 31 in the container front plate 33, the storage box front plate 44 may be flush with the container front plate 33, so that the arrangement between the storage box 40 and the container 30 is flatter. Of course, the storage box front plate 44 may further extend to a front side of the container front plate 33, i.e., the storage box front plate 44 is more forward than the container front plate 33, so that the sealing effect between the storage box front plate 44 and the container front plate 33 is better.

According to an optional embodiment of the present disclosure, as illustrated in FIGS. 4 and 5, a circumferential edge of the part of the repair opening 31 in the container bottom plate 32 has a first step 36 sunken downwards, the storage box bottom plate 49 is in a clearance fit with or abuts against the first step 36. An edge of the storage box bottom plate 49 has a flanging 48, and the flanging 48 is in a clearance fit with or abuts against the first step 36, so that the sealing between the storage box bottom plate 49 and the container bottom plate 32 is better improved, and the goods can be prevented from leaking out from a gap between the storage box bottom plate 49 and the container bottom plate 32 and finally falling from the repair opening 31.

In addition, as illustrated in FIGS. 4 and 5, a circumferential edge of the part of the repair opening 31 in the container front plate 33 has a second step 37 sunken towards a front of the all-terrain vehicle 1, and the storage box front plate 44 is in a clearance fit with or abuts against the second step 37. The storage box front plate 44 is in a clearance fit with or abuts against the second step 37, and the second step 37 is sunken towards the front of the all-terrain vehicle 1, so that the storage box front plate 44 can better fit with the second step 37, so that the sealing effect between the storage box front plate 44 and the container front plate 33 can be better.

According to an optional embodiment of the present disclosure, as illustrated in FIGS. 3 to 5, the storage box 40 includes a storage box rear plate 45, the storage box rear plate 45 extends obliquely along a front-rear direction of the all-terrain vehicle 1, and a storage opening 42 for storing or taking out objects is defined in the storage box rear plate 45. The storage box rear plate 45 extends obliquely along the front-rear direction of the all-terrain vehicle 1, and the storage opening 42 for storing or taking out the objects is defined in the storage box rear plate 45, so that the volume of the storage opening 42 may be increased as much as possible, thus storing more goods. In addition, in this arrangement the storage box 40 may completely cover the repair opening 31, thus preventing the goods in the container 30 from falling from the repair opening 31.

In addition, as illustrated in FIGS. 3 to 5, a detachable cover plate 47 is arranged at the storage opening 42, and the cover plate 47 is provided with a boss 41. The cover plate 47 may be covered at an opening of the storage opening 42, so that the cover plate 47 may isolate the storage opening 42 from the external environment, thus preventing the goods in the storage opening 42 from being affected or damaged under special circumstances. It should be noted that the cover plate 47 may be detachably arranged on the storage box 40, or may be integrally formed with the storage box 40. The cover plate 47 is provided with the boss 41. Thus when the user need to open the cover plate 47, he may clamp the boss 41 with his fingers, and then twist or directly lift the cover plate 47, so that the operation is more convenient.

Further, as illustrated in FIGS. 3 to 5, a plurality of storage openings 42 are provided, a plurality of cover plates 47 are provided, and the plurality of storage openings 42 are in one-to-one correspondence to the plurality of cover plates 47. The plurality of storage openings 42 are provided, so that different goods may be placed in the plurality of storage openings 42 respectively, so that the distinctiveness is realized and it is convenient for the user to manage and store her/his goods. In addition, the plurality of storage openings 42 need to be configured with the plurality of cover plates 47 in one-to-one correspondence, thus ensuring that the goods in the plurality of storage openings 42 is not affected or damaged. Of course, the storage box 40 may only have one storage opening 42 and one cover plate 47, which may be set according to the actual situation.

In addition, a connecting line is arranged between the plurality of cover plates 47. The connecting line may be arranged between the plurality of cover plates 47 when the plurality of cover plates 47 are arranged, thus preventing one of the cover plates 47 from being lost and causing economic losses. Moreover, when one of the plurality of cover plates 47 is opened, this cover plate 47 may be covered on other cover plates 47, thus realizing convenience and further preventing the cover plate 47 from being lost.

Optionally, as illustrated in FIGS. 3 to 6, the frame 10 includes: a bottom bracket 11, a first support beam 12, a cross beam 13, a second support beam 14 and an upper bracket 15. The seats 20 are arranged on the bottom bracket 11, the first support beams 12 are coupled to a left side and a right side of the bottom bracket 11 respectively, and the first support beams 12 extend upwards. The cross beam 13 is coupled between the first support beams 12, the second support beams 14 are coupled to a left end and a right end of the cross beam 13 respectively, and the second support beams 14 extend downwards. The upper bracket 15 is arranged between the second support beams 14, and the container 30 is arranged on the upper bracket 15. The storage box 40 is detachably arranged on the cross beam 13 and the upper bracket 15.

The seats 20 are arranged on the bottom bracket 11, and the bottom bracket 11 may support the seats 20, so that the seats 20 has a certain bearing capacity. The first support beams 12 are coupled to the left side and the right side of the bottom bracket 11 respectively, and the first support beams 12 extend upwards, so that the bottom bracket 11 may vertically support the first support beams 12, thus ensuring the mounting and the support capacity of the first support beams 12. The cross beam 13 is coupled between the first support beams 12, so that the cross beam 13 may have the capacity of transverse mounting. The second support beams 14 are coupled to the left end and the right end of the cross beam 13 respectively, and the second support beams 14 extend downwards, so that the second support beams 14 may further support the cross beam 13. Moreover, a direction of a supporting force of the first support beam 12 on the cross beam 13 is different from a direction of a supporting force of the second support beam 14 on the cross beam 13, so that the mounting bearing capacity of the cross beam 13 may be increased. The upper bracket 15 is arranged between the second support beams 14, so that the upper bracket 15 has a certain mounting capacity. The container 30 is arranged on the upper bracket 15, and the storage box 40 is detachably arranged on the cross beam 13 and the upper bracket 15, so that the cross beam 13 and the upper bracket 15 may better bear the weights of the container 30 and the storage box 40, and can further avoid the damage of the container 30 and the storage box 40 to the frame 10.

As illustrated in FIGS. 5 and 6, the cross beam 13 extends along the left-right direction of the all-terrain vehicle 1, and the cross beam 13 is located behind the seats 20. A first mounting support 16 is arranged on the cross beam 13, and the storage box 40 is detachably coupled to the first mounting support 16. The cross beam 13 extends along the left-right direction of the all-terrain vehicle 1 and is located behind the seats 20, thus facilitating the mounting of the cross beam 13 and the storage box 40 and avoiding the interference of the storage box 40 and the seats 20 during the mounting of the storage box 40. In addition, at least two first mounting supports 16 are provided, and the storage box 40 may be coupled to the at least two first mounting supports 16, to couple the storage box 40 to the cross beam 13 and further fix it to the frame 10 of the all-terrain vehicle 1.

Moreover, the storage box 40 is detachably coupled to the at least two first mounting supports 16, so that the storage box 40 may be removed from the cross beam 13, so that the powertrain 50 can be repaired through the repair opening 31.

In addition, as illustrated in FIGS. 5 and 6, the upper bracket 15 is located above the power system 51, a second mounting support 17 is arranged on the upper bracket 15, and the storage box 40 is detachably coupled to the second mounting support 17. The upper bracket 15 is arranged above the power system 51, and the second mounting support 17 is arranged on the upper bracket 15. Also, at least two second mounting supports 17 are provided, and the storage box 40 is mounted with the at least two second mounting supports 17, to couple the storage box 40 to the upper bracket 15 and further fix it to the frame 10 of the all-terrain vehicle 1. Moreover, the storage box 40 is detachably coupled to the at least two second mounting supports 17, so that the storage box 40 may be removed from the upper bracket 15, so that the powertrain 50 can be repaired through the repair opening 31.

Of course, as illustrated in FIGS. 3 to 6, the storage box 40 includes a storage box top plate 43, and the storage box top plate 43 is provided with a grip 46 for facilitating mounting or removal. The storage box top plate 43 may play a role of covering, thus making the appearance of the all-terrain vehicle 1 neat. The storage box top plate 43 is provided with the grip 46. Thus after the storage box 40 is removed from the frame 10, the hand may be placed at the grip 46, and then the storage box 40 may be removed from the frame 10 by means of the grip 46, thus making the mounting process and the removal process of the storage box 40 easier and convenient. In addition, on the premise that the grip 46 may be used normally, the grip 46 may be protruded or recessed, thus representing the diversity of the structure of the grip 46.

According to an optional embodiment of the present disclosure, the power system 51 includes an engine 511 including a cylinder head 5111, and the cylinder head 5111 may be repaired after the storage box 40 is removed. The engine 511 may provide power for all-terrain vehicle 1 after started, so that all-terrain vehicle 1 may move. The cylinder head 5111 is mounted at an upper portion of a cylinder block of the engine 511, seals the cylinder from the upper portion to constitute a combustion chamber. The cylinder head 5111 is often in contact with high-temperature and high-pressure gas, so the cylinder head 5111 needs to bear a lot of thermal load and mechanical load. During the operation of the engine 511, the cylinder head 5111 is prone to damage due to various reasons, which makes the engine 511 unable to operate normally. After the storage box 40 is removed, the cylinder head 5111 may be repaired from the repair opening 31 exposed after the storage box 40 is removed, thus ensuring the normal operation of the engine 511. In addition, too many disassembly processes and steps can be avoided and the operation is more convenient.

In addition, the power system 51 further includes a CVT (a continuously variable transmission) 512, and the CVT 512 may be repaired after the storage box 40 is removed. The CVT 512 may allow a gear ratio to change continuously, so that the power transmission of the all-terrain vehicle 1 may be continuous and smooth. During the operation of the all-terrain vehicle 1, the CVT 512 is easy to be damaged due to the improper operation of the driver or the CVT 512's own structure. After the storage box 40 is removed, the CVT 512 may be repaired from the repair opening 31 exposed after the storage box 40 is removed, thus ensuring the normal operation of the CVT 512. In addition, too many disassembly processes and steps can be avoided and the operation is more convenient.

The present disclosure aims to solve at least one of the technical problems existing in the related art. To this end, the present disclosure proposes an all-terrain vehicle. In the all-terrain vehicle, a storage box may be removed from a frame, and then a power system and/or an air filter may be repaired from a removal position of the storage box. This is more convenient and avoids too many disassembly processes and steps. In addition, the storage box can be prevented from being affected by the space of a cockpit and an energy compartment of the all-terrain vehicle, so that the structure of the all-terrain vehicle is more compact, with as much storage as possible.

The all-terrain vehicle according to the present disclosure includes: a frame, the frame including a longitudinal beam extending along a front-rear direction of the all-terrain vehicle and a vertical beam extending upwards from the longitudinal beam; a seat arranged on the frame; a container arranged on the frame and located at a rear side of the seat, a top of the container being open; a power system arranged on the frame and located below the container, an air filter coupled to the power system and configured to deliver air to the power system, the air filter being arranged on the frame and being located below the container; and a storage box arranged on the frame and located behind the seat, the storage box being detachably coupled to the frame, the air filter and/or the power system being repairable after the storage box being removed.

In the all-terrain vehicle according to the present disclosure, the storage box may be removed from the frame. When the power system and/or the air filter fail, the storage box may be removed from the frame first, and then the power system and/or the air filter may be repaired from the removal position of the storage box. This is more convenient and avoids too many disassembly processes and steps. In addition, the storage box is behind the seat, so that the storage box can be prevented from being affected by the space of the cockpit and the energy compartment of the all-terrain vehicle. Furthermore, this arrangement can make the structure of the all-terrain vehicle more compact and utilize the space of the all-terrain vehicle for storage as much as possible, thus better meeting the storage requirements of users.

In some embodiments of the present disclosure, the power system and the air filter are located below the storage box.

In some embodiments of the present disclosure, along a left-right direction of the all-terrain vehicle, the power system is located at a first side of the all-terrain vehicle, and the air filter is located at a second side of the all-terrain vehicle.

In some embodiments of the present disclosure, the container defines a repair opening at a position corresponding to the power system or the air filter, and the storage box is arranged at the repair opening.

In some embodiments of the present disclosure, the container includes a container bottom plate, a container front plate, a container side plate and a container rear plate, the container side plate is coupled between the container front plate and the container rear plate, and the repair opening is defined in the container bottom plate and/or the container front plate.

In some embodiments of the present disclosure, the container front plate and the container bottom plate define a communicated repair opening, the storage box includes a storage box bottom plate and a storage box front plate coupled to the container, and the storage box bottom plate covers the repair opening in the container bottom plate.

In some embodiments of the present disclosure, the storage box front plate covers the repair opening in the container front plate.

In some embodiments of the present disclosure, a circumferential edge of the repair opening of the container bottom plate is provided with a first step sunken downwards, the storage box bottom plate is in a clearance fit with or abuts against the first step, a circumferential edge of the repair opening of the container front plate is provided with a second step sunken towards a front of the all-terrain vehicle, and the storage box front plate is in a clearance fit with or abuts against the second step.

In some embodiments of the present disclosure, the storage box includes a storage box rear plate, the storage box rear plate extends obliquely along the front-rear direction of the all-terrain vehicle, and the storage box rear plate defines a storage opening configured to store or remove an object.

In some embodiments of the present disclosure, a detachable cover plate is arranged at the storage opening, and the cover plate is provided with a boss.

In some embodiments of the present disclosure, the frame includes a cross beam extending along a left-right direction of the all-terrain vehicle, the cross beam is located behind the seat, the cross beam is provided with a first mounting support, and the storage box is detachably coupled to the first mounting support.

In some embodiments of the present disclosure, the frame includes an upper bracket located above the power system, the upper bracket is provided with a second mounting support, and the storage box is detachably coupled to the second mounting support.

In some embodiments of the present disclosure, the storage box includes a storage box top plate, and the storage box top plate is provided with a grip for facilitating mounting or removal.

In some embodiments of the present disclosure, the power system includes an engine including a cylinder head, and the cylinder head is repairable after the storage box is removed.

In some embodiments of the present disclosure, the power system includes a CVT, and the CVT is repairable after the storage box is removed.

In the description of the present disclosure, it should be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are only for convenience of description and do not indicate or imply that the device or element referred to must have a particular orientation, or be constructed and operated in a particular orientation. Thus, these terms shall not be construed as limitation on the present disclosure.

In the description of the present disclosure. "first feature" and "second feature" may include one or more of the features. In the description of the present disclosure, "a plurality of" means two or more that two. In the description of the present disclosure, a structure in which a first feature is "on" or "below" a second feature may include an embodiment in which the first feature is in direct contact with the second feature, and may further include an embodiment in which the first feature and the second feature are not in direct contact with each other, but are contacted via an additional feature formed therebetween. In the description of the present disclosure, a first feature "on," "above," or "on top of" a second feature may include an embodiment in which the first feature is right or obliquely "on," "above," or "on top of" the second feature, or just means that the first feature is at a height higher than that of the second feature.

Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present disclosure. Thus, the exemplary descriptions of the above terms throughout this specification are not necessarily referring to the same embodiment or example.

Although embodiments of the present disclosure have been shown and described, it would be appreciated by those skilled in the art that various changes, modifications, alternatives and variations may be made in the embodiments without departing from principles and purposes of the present disclosure. The scope of the present disclosure is defined by the claims and their equivalents.

What is claimed is:

1. An all-terrain vehicle, comprising:
a frame;
a cockpit supported by the frame;
two seats located in the cockpit and arranged on the frame;
a container arranged on the frame and located at a rear side of the two seats, a top of the container being open;
a power system arranged on the frame and located below the container;
an air filter coupled to the power system and configured to deliver air to the power system, the air filter being arranged on the frame and located below the container; and
a storage box arranged on the frame, located behind the two seats and at least partially located inside the container, the storage box being detachably coupled to the frame, the air filter and/or the power system being repairable after the storage box being removed,
wherein the air filter is located above the power system.

2. The all-terrain vehicle according to claim 1, wherein the power system and the air filter are located below the storage box.

3. The all-terrain vehicle according to claim 2, wherein along a left-right direction of the all-terrain vehicle, the power system is located at a first side of the all-terrain vehicle, and the air filter is located at a second side of the all-terrain vehicle.

4. The all-terrain vehicle according to claim 2, wherein the container defines a repair opening at a position corresponding to the power system or the air filter, and the storage box is arranged at the repair opening.

5. The all-terrain vehicle according to claim 4, wherein the container comprises a container bottom plate, a container front plate, a container side plate and a container rear plate, the container side plate is coupled between the container front plate and the container rear plate, and the repair opening is defined in at least one of the container bottom plate and the container front plate.

6. The all-terrain vehicle according to claim 5, wherein the container front plate and the container bottom plate cooperatively define the repair opening communicated between the container front plate and the container bottom plate, the storage box comprises a storage box bottom plate and a storage box front plate coupled to the container, and the storage box bottom plate covers a part of the repair opening in the container bottom plate.

7. The all-terrain vehicle according to claim 6, wherein the storage box front plate covers a part of the repair opening in the container front plate.

8. The all-terrain vehicle according to claim 6, wherein the storage box front plate is flush with the container front plate.

9. The all-terrain vehicle according to claim 6, wherein the storage box front plate extends to a front side of the container front plate.

10. The all-terrain vehicle according to claim 6, wherein a circumferential edge of the part of the repair opening in the container bottom plate is provided with a first step sunken downwards, the storage box bottom plate is in a clearance fit with or abuts against the first step, a circumferential edge of a part of the repair opening in the container front plate is provided with a second step sunken towards a front of the all-terrain vehicle, and the storage box front plate is in a clearance fit with or abuts against the second step.

11. The all-terrain vehicle according to claim 6, wherein the storage box comprises a storage box rear plate, the storage box rear plate extends obliquely along a front-rear direction of the all-terrain vehicle, and the storage box rear plate defines a storage opening configured to store or remove an object.

12. The all-terrain vehicle according to claim 11, wherein the storage box comprises a detachable cover plate arranged at the storage opening, and the cover plate is provided with a boss.

13. The all-terrain vehicle according to claim 12, wherein a plurality of storage openings are provided, a plurality of cover plates are provided, and the plurality of storage openings are in one-to-one correspondence to the plurality of cover plates.

14. The all-terrain vehicle according to claim 1, wherein the frame comprises a cross beam extending along a left-right direction of the all-terrain vehicle, the cross beam is located behind the two seats, the cross beam is provided with a first mounting support, and the storage box is detachably coupled to the first mounting support.

15. The all-terrain vehicle according to claim 14, wherein the frame comprises an upper bracket located above the power system, the upper bracket is provided with a second mounting support, and the storage box is detachably coupled to the second mounting support.

16. The all-terrain vehicle according to claim 1, wherein the storage box comprises a storage box top plate, and the storage box top plate is provided with a grip for facilitating mounting or removal.

17. The all-terrain vehicle according to claim 1, wherein the power system comprises an engine comprising a cylinder head, and the cylinder head is repairable after the storage box is removed.

18. The all-terrain vehicle according to claim 1, wherein the power system comprises a CVT, and the CVT is repairable after the storage box is removed.

19. An all-terrain vehicle, comprising:
a frame;
a cockpit supported by the frame;
two seats located in the cockpit and arranged on the frame;
a container arranged on the frame and located at a rear side of the two seats, a top of the container being open;
a power system arranged on the frame and located below the container;
an air filter coupled to the power system and configured to deliver air to the power system, the air filter being arranged on the frame and located below the container; and
a storage box arranged on the frame, located behind the two seats and at least partially located inside the container, the storage box being detachably coupled to the frame, the air filter and/or the power system being repairable after the storage box being removed,
wherein the frame comprises a bottom bracket, first support beams, a cross beam, second support beams and an upper bracket; the two seats are arranged on the bottom bracket; the first support beams are coupled to a left side and a right side of the bottom bracket respectively, and the first support beams extend upwards; the cross beam is coupled between the first support beams; the second support beams are coupled to a left end and a right end of the cross beam respectively, and the second support beams extend downwards; the upper bracket is arranged between the second support beams, and the container is arranged on the upper bracket; and the storage box is detachably arranged on the cross beam and the upper bracket.

20. An all-terrain vehicle, comprising:
a frame;
a cockpit supported by the frame;
two seats located in the cockpit and arranged on the frame;
a container arranged on the frame and located at a rear side of the two seats, a top of the container being open;
a power system arranged on the frame and located below the container;
an air filter coupled to the power system and configured to deliver air to the power system, the air filter being arranged on the frame and located below the container; and
a storage box arranged on the frame, located behind the two seats and at least partially located inside the container, the storage box being detachably coupled to the frame, the air filter and/or the power system being repairable after the storage box being removed,
wherein the power system and the air filter are located below the storage box, the container defines a repair opening at a position corresponding to the power system or the air filter, and the storage box is arranged at the repair opening.

* * * * *